(12) United States Patent
Takahashi

(10) Patent No.: US 7,894,012 B2
(45) Date of Patent: Feb. 22, 2011

(54) BACKLIGHT DEVICE AND LIQUID CRYSTAL DISPLAY DEVICE USING THE SAME

(75) Inventor: Yuhji Takahashi, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 325 days.

(21) Appl. No.: 12/092,097

(22) PCT Filed: Aug. 25, 2006

(86) PCT No.: PCT/JP2006/316675

§ 371 (c)(1),
(2), (4) Date: Apr. 30, 2008

(87) PCT Pub. No.: WO2007/060776

PCT Pub. Date: May 31, 2007

(65) Prior Publication Data

US 2009/0268122 A1    Oct. 29, 2009

(30) Foreign Application Priority Data

Nov. 28, 2005    (JP) .............................. 2005-341901

(51) Int. Cl.
*G02F 1/1333* (2006.01)

(52) U.S. Cl. .............................. 349/58; 349/61; 349/62; 349/63; 349/64; 349/65; 349/66; 349/67; 349/68; 349/69; 349/70; 349/71

(58) Field of Classification Search .................. None
See application file for complete search history.

(56) References Cited

U.S. PATENT DOCUMENTS

| | | | |
|---|---|---|---|
| 6,273,577 B1* | 8/2001 | Goto et al. .................. 362/615 |
| 6,985,131 B2* | 1/2006 | Kawada et al. .............. 345/102 |
| 7,334,934 B2* | 2/2008 | Feng et al. .................. 362/626 |
| 7,750,990 B2* | 7/2010 | Jeong .......................... 349/58 |
| 7,798,700 B2* | 9/2010 | Sun ............................. 362/628 |
| 2002/0030982 A1* | 3/2002 | Ha .............................. 362/31 |

FOREIGN PATENT DOCUMENTS

| | | |
|---|---|---|
| JP | 06-308489 A | 11/1994 |
| JP | 10-048427 A | 2/1998 |
| JP | 2002-184230 A | 6/2002 |
| JP | 2002-251911 A | 9/2002 |
| JP | 2004-296193 A | 10/2004 |

OTHER PUBLICATIONS

Official communication issued in the International Application No. PCT/JP2006/316675, mailed on Nov. 28, 2006.

* cited by examiner

*Primary Examiner*—David Nelms
*Assistant Examiner*—Thanh-Nhan P Nguyen
(74) *Attorney, Agent, or Firm*—Keating & Bennett, LLP

(57) ABSTRACT

A backlight device includes projections disposed on the back side of a light guide plate, and engagement holes engaging with the projections formed in a housing. The projections of the light guide plate are engaged with the engagement holes in the housing to prevent displacement of the light guide plate caused by vibration and impact. One surface of each projection is flush with a light incident surface, the area of that cross-section of each projection which is parallel or substantially parallel to the light incident surface is set such that it continuously decreases as the section is farther away from the light incident surface, and as a result, occurrence of a bright line and a dark line is prevented.

9 Claims, 5 Drawing Sheets

BACKLIGHT DEVICE AND LIQUID CRYSTAL DISPLAY DEVICE USING THE SAME

BACKGROUND OF THE INVENTION

1. Field of the Invention

The present invention relates to a backlight device and a liquid crystal display device using the backlight device, and more specifically to a backlight device of a so-called side light type using a light guide plate and to a liquid crystal display device using the backlight device.

2. Description of the Related Art

In a non-self-emitting display device such as a liquid crystal display device, a so-called backlight device is typically arranged which irradiates a display panel from behind. This backlight device is of a direct light type, side light type, planar light source type, or the like. For a small-sized display device, in terms of slimming-down and weight saving, those of the side light type are currently widely used.

The backlight of this side light type irradiates a back surface of the display panel by making light from a light source incident on a side surface of a light guide plate and exit as a flat light source from a front surface thereof by making the light travel in the light guide plate in a manner so as to be totally reflected therein while making part of the light reflected by a reflective sheet fitted on a back surface of the light guide plate or by changing the propagation direction of the light with a medium border surface and a pattern formed on the light guide plate.

Displacement of the light guide plate built in the backlight device of the side light type due to vibration, impact, and the like influences the display quality. Moreover, the displacement may cause a collision between a member, such as a light source lamp, surrounding the light guide plate and the light guide plate, resulting in damage to the surrounding member and the light guide plate itself.

Thus, various technologies for fixing a light guide plate to prevent its displacement have been suggested. For example, JP-A-H6-308489 suggests a technology of fixing a light guide plate in a case by providing a depression or a projection on a surface other than a light incident surface of the light guide plate, also providing a projection or a depression at a position of the case facing this, and engaging the projection and the depression with each other. In addition, JP-A-H 10-48427 suggests a technology of positioning and fixing a light guide plate by providing a stopper on a light exit surface side at the leading end facing a light incident surface of the light guide plate or a surface side facing the light exit surface side.

As shown in FIG. 8, forming projections 114a and 114b on side surfaces of a light guide plate 11', forming engaging grooves 132a and 132b in a case 13, then fitting the light guide plate 11' to the case 13 with the projections 114a and 114b of the light guide plate 11' being engaged with the engaging grooves 132a and 132b of the case 13 prevents displacement of the light guide plate 11' caused by vibration and impact. However, since the projections 114a and 114b project abruptly from the light guide plate 11', light reflects and diffuses at boundaries between the light guide plate 11' and the projections 114a and 114b, which disturbs the light propagation uniformity. This results in a problem that a bright line and a dark line occur near the roots of the projections 114a and 114b, causing non-uniformity in the brightness of illumination light and further decreasing the light emission efficiency. Although the projections are formed on the side surface of the light guide plate 11' of FIG. 8, brightness non-uniformity is similarly observed in a case where projections are formed on the back side of the light guide plate 11'.

SUMMARY OF THE INVENTION

In order to overcome the problems described above, preferred embodiments of the present invention prevent displacement of a light guide plate and also suppress the occurrence of a bright line and a dark line.

According to a preferred embodiment of the present invention, a backlight device includes a case, a light guide plate fitted in the case, and a light source provided near at least one side surface of the light guide plate. In the backlight device, a projection is formed on a back side of the light guide plate so that one surface of the projection is flush with a light incident surface, an area of a cross section of the projection which is parallel or substantially parallel with the light incident surface continuously decreases as the section is farther away from the light incident surface, and an engaging hole engaging with the projection is formed in the case.

Here, in terms of further preventing occurrence of a bright line of the light guide plate, it is preferable that a boundary between the light guide plate and the projection be chamfered or rounded.

Moreover, in terms of improving the quality of a display device, it is preferable that the projection be formed on both ends of a back surface of the light guide plate.

According to another preferred embodiment of the present invention, a liquid crystal display device includes a liquid crystal panel and a backlight device irradiating the liquid crystal panel from behind. In the liquid crystal display device, as the backlight device, any of those described above is used.

In a backlight device according to a preferred embodiment of the present invention, a projection is formed on a back side of a light guide plate and also an engaging hole engaging with this projection is formed in a case, and engaging the projection of the light guide plate with the engaging hole of the case can effectively prevent displacement of the light guide plate caused by vibration, impact, and the like. Moreover, in the backlight device according to a preferred embodiment of the present invention, the projection is formed so that one surface thereof is flush with a light incident surface, and also an area of a cross section of the projection which is in parallel with the light incident surface continuously decreases as the section is farther away from the light incident surface. Thus, unlike a projection formed on a conventional light guide plate, occurrence of a bright line and a dark line can be effectively prevented.

Moreover, chamfering or rounding a boundary between the light guide plate and the projection can further prevent the occurrence of a bright line at the light guide plate.

Further, forming the projection on both ends of the back surface of the light guide plate can prevent quality deterioration of the display device even when a bright line occurs since they are located outside a display region.

Moreover, in a liquid crystal display device according to a preferred embodiment of the present invention, as the backlight device, any of those described above is preferably used. Thus, favorable display without brightness non-uniformity is provided.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, a backlight device and a liquid crystal display device according to preferred embodiments of the present invention will be described, with reference to the accompanying drawings. Note that the present invention is not at all limited to the preferred embodiments described below.

Figure 1:
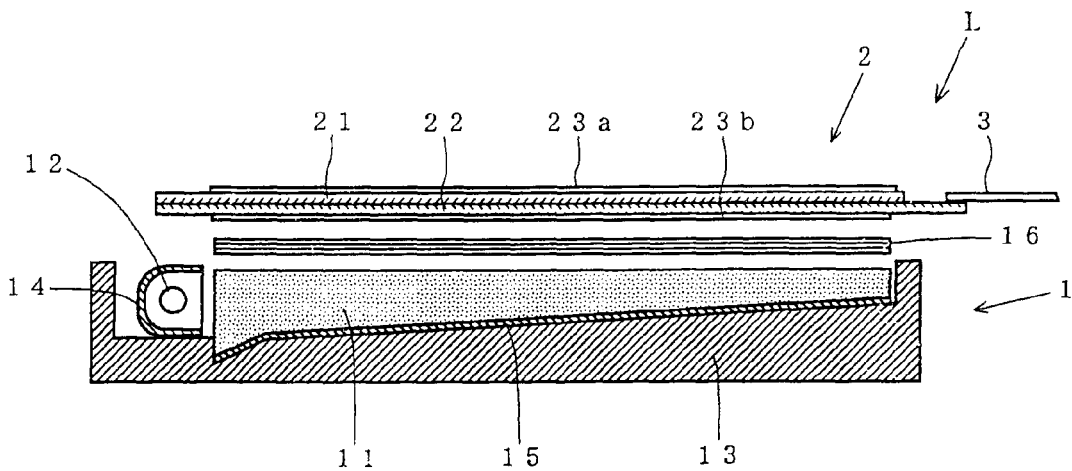
FIG. 1 is a schematic sectional view showing one example of a backlight device and a liquid crystal display device according to a preferred embodiment of the present invention.

FIG. 1 shows a schematic configuration diagram showing one example of the backlight device and liquid crystal display device according to a preferred embodiment of the present invention. The liquid crystal display device L of FIG. 1 includes a backlight 1 and a liquid crystal panel 2. The backlight 1 has a light guide plate 11, which is wedge-shaped in cross section, which has a back surface thereof fitted with a reflective sheet 15, and which is stored in a case (housing) 13a having a rectangular or substantially rectangular shape with the top thereof opening. On the front surface of the light guide plate 11, a plurality of optical sheets 16 are arranged. Near the end surface of the light guide plate 11 on the larger thickness side, a cold cathode tube (light source) 12 is arranged. The surrounding of the cold cathode tube 12 is covered with a reflective case 14 so that light from the cold cathode tube 12 can be efficiently made incident on a light incident surface of the light guide plate 11.

On the other hand, the liquid crystal panel 2 is formed of a pair of opposing glass substrates 21 and 22 spaced apart from each other with a liquid crystal (not shown) enclosed therebetween. The outer edge of the glass substrate 22 extends more outward than the glass substrate 21. Formed on this extending portion are a large number of electrode terminals (not shown) for applying voltage to pixel electrodes formed on the front surface of the glass substrate 22. On the front and back surfaces of the liquid crystal panel 2, deflection plates 23a and 23b are fitted. The electrode terminals formed on the glass substrate 22 are connected to a circuit board, not shown, via an FPC (Flexible Printed Circuit) 3.

Light emitted from the cold cathode tube 12 enters the light guide plate 11 from the side end surface thereof, and travels inside the light guide plate 11 while repeating its reflection. Specifically, the light guide plate 11 has a larger refractive index than air, and thus the light travels inside the light guide plate while totally reflected on the front surface of the light guide plate 11. On the other hand, on the back surface of the light guide plate 11, the reflective sheet 15 is fitted, which directs the light upward along a light exit surface. As the reflective sheet 15, any conventional one, such as a sheet-type member of metal or a white PET film, can be used. The light exiting from the light guide plate 11 irradiates the back surface of the liquid crystal panel 2 through the optical sheets 16.

Figure 2:
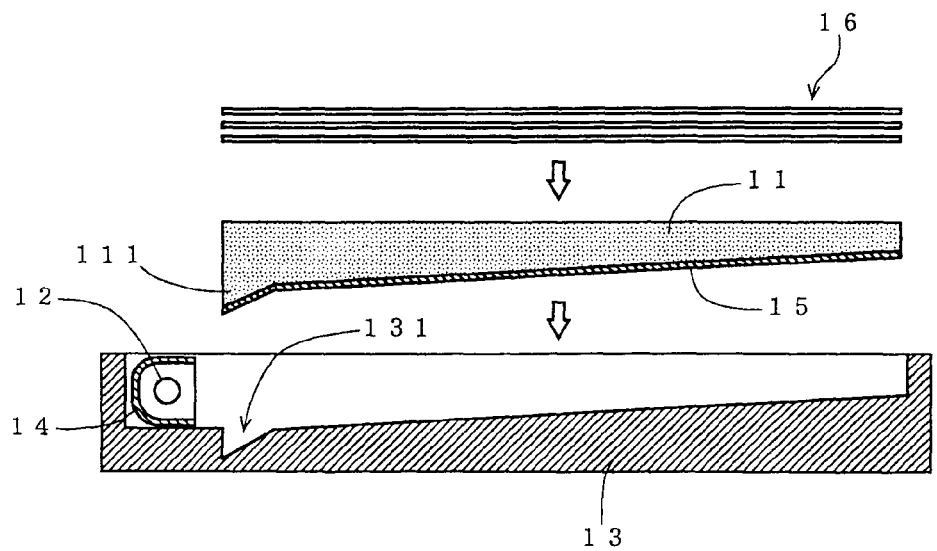
FIG. 2 is an exploded view of the backlight device of FIG. 1.
Figure 3:
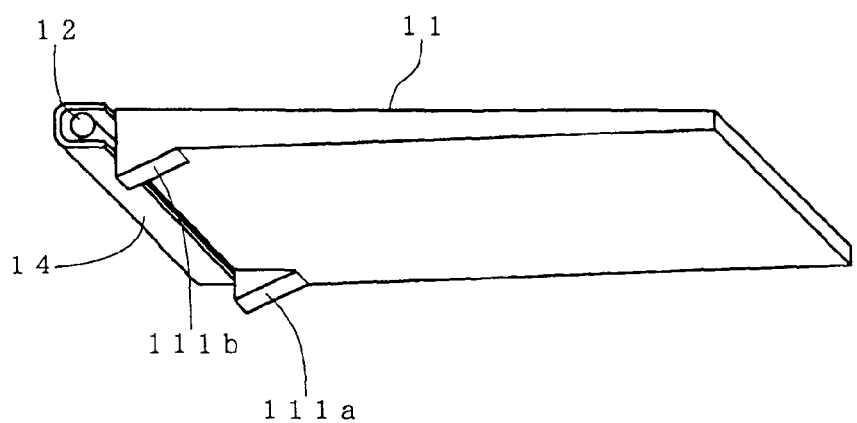
FIG. 3 is a perspective view of a light guide plate used in the backlight device of FIG. 1.

FIG. 2 shows an assembly diagram showing fitting of the light guide plate 11 to the case 13, and FIG. 3 shows a perspective view of the light guide plate 11 of FIG. 2. As can be understood from these figures, the light guide plate 11 is formed into a so-called wedge shape that is thick on the light incident surface side and thin on the surface side opposite to the light incident surface. On the both side ends of the back surface of the light guide plate 11, projections 111 (general term for 111a and 111b) that are preferably triangular-shaped in a side view are formed so that one surface of each of the projections 111 is flush with the light incident surface. On the other hand, in the inner bottom surface of the case 13, an engaging hole 131 is formed which engages with the projections 111 of the light guide plate 11. Through the engagement of the projections 111 with this engaging hole 131, the light guide plate 11 is fitted in such a manner as to be positioned in the case 13, which effectively prevents displacement of the light guide plate 11 caused by vibration, impact, and the like.

Here, the projections 111 formed on the back surface of the light guide plate 11 need to be shaped such that the area of a cross section which is parallel or substantially parallel to the light incident surface continuously decreases as the section is farther away from the light incident surface. Forming the projections 111 into such a shape as abruptly projects from the light guide plate 11 causes light to reflect and diffuse at a boundary between the light guide plate 11 and the projections 111, thereby causing a bright line and a dark line. Thus, in the present preferred embodiment, it is preferably to form the projections 111 into a shape that gradually projects from the light guide plate 11 to thereby suppress the occurrence of a bright line and a dark line.

Figure 4A:
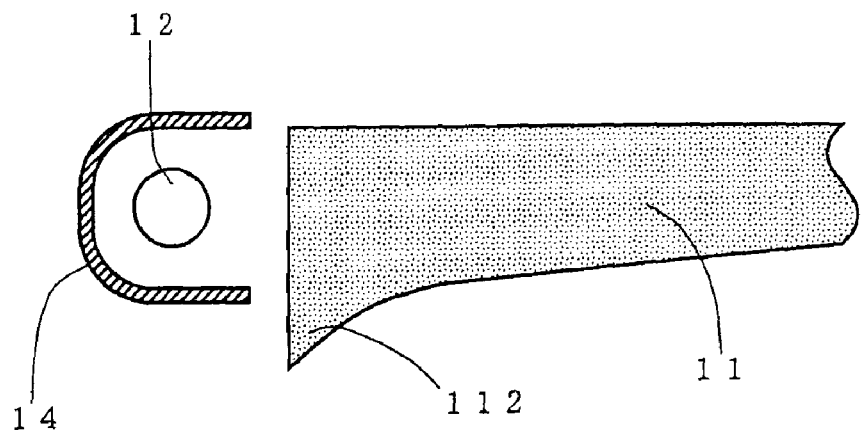
FIGS. 4A and 4B are partially sectional views showing another example of the light guide plate used in the backlight device according to a preferred embodiment of the present invention.
Figure 4B:
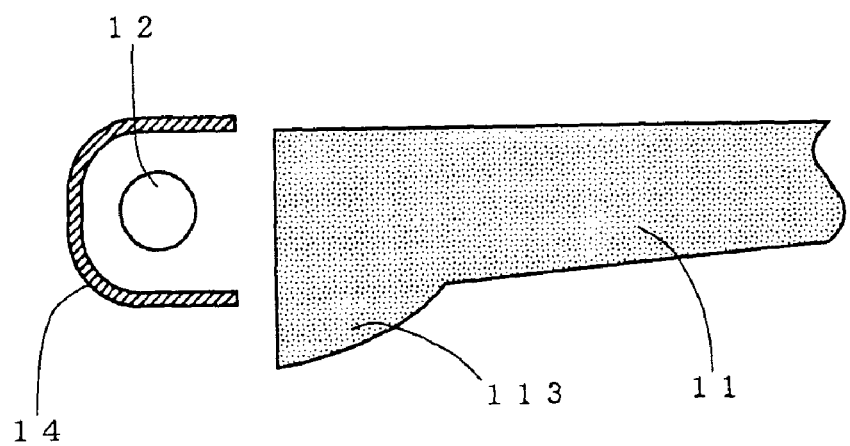

The shape of the projections 111 is not limited to a triangle in a side view, and thus may be any shape as long as it satisfies the requirement described above. Other shapes of the projections include: for example, as shown in FIGS. 4A and 4B, a shape with an oblique side of a triangle concaved (numeral 112 of FIG. 4A and a shape with the oblique side of a triangle convexed (numeral 113 of FIG. 4B) in a side view.

Figure 5A:
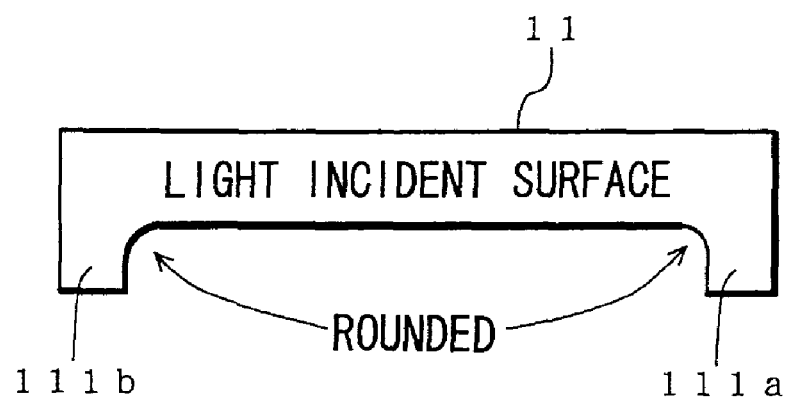
FIGS. 5A and 5B are elevations showing another example of the light guide plate used in the backlight device according to a preferred embodiment of the present invention.
Figure 5B:
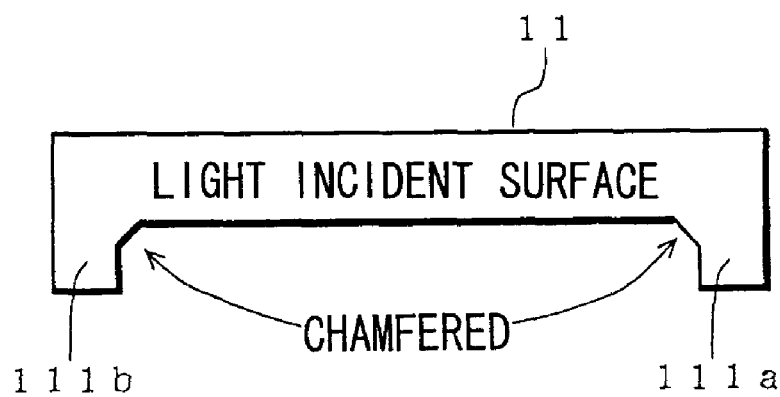

Moreover, as shown in FIGS. 5A and 5B, it is preferable that the boundaries between the light guide plate 11 and the projections 111a and 111b be chamfered or rounded. This is because providing such a shape can suppress light reflection and diffusion at the boundaries between the light guide plate 11 and the projections 111a and 111b and even more effectively prevent the occurrence of a bright line and a dark line.

The positions at which the projections are formed are not limited to the both sides of the back surface of the light guide plate, and thus may be any position such that one surface of each of the projections is flush with the light incident surface. However, it is preferable that the projections be formed on an area outside a display area of the display device, that is, on the both sides of the light guide plate, because this is less likely to influence the display screen even when a bright line and a dark line are caused by the projections.

The projections may be shaped integrally with the light guide plate or may be joined with a light guide plate separately formed. In terms of productivity, strength, etc., it is preferable that they be shaped integrally with the light guide plate. Exemplified as its shaping method is, for example, shaping achieved by pouring translucent resin into a mold. Examples of a material for the light guide plate include: polycarbonate, polymethlmethacrylate, and so on.

Figure 6:
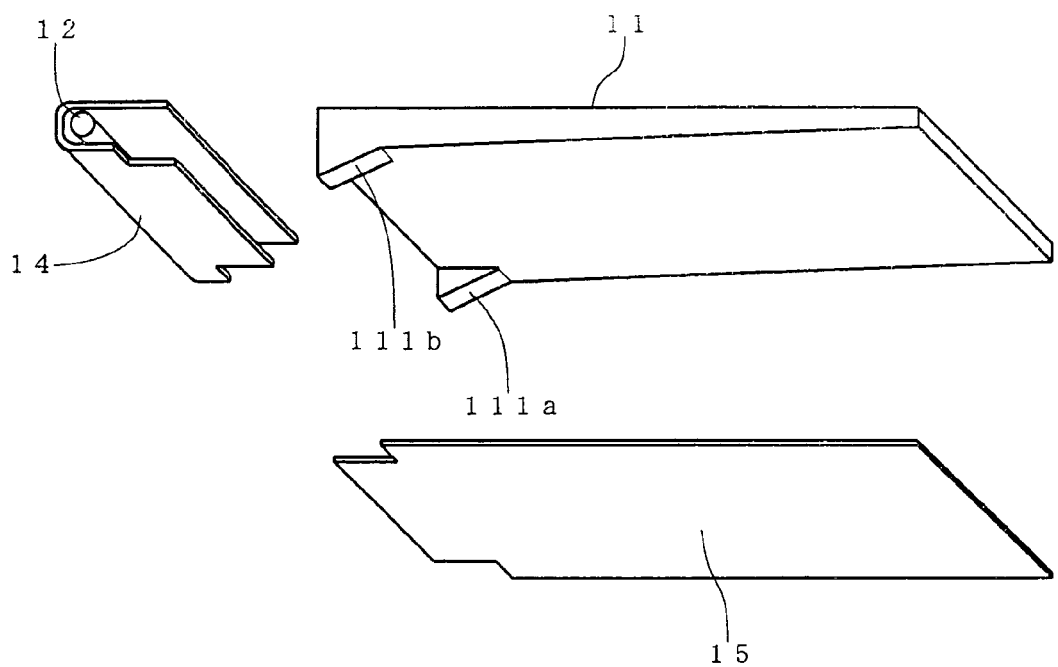
FIG. 6 is a perspective assembly diagram showing another example of the backlight device according to a preferred embodiment of the present invention.
Figure 7:
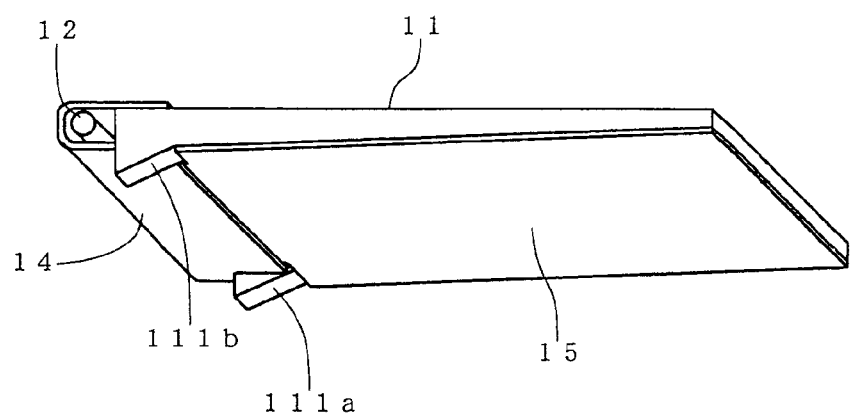
FIG. 7 is an assembled diagram of the backlight device of FIG. 6.
Figure 8:
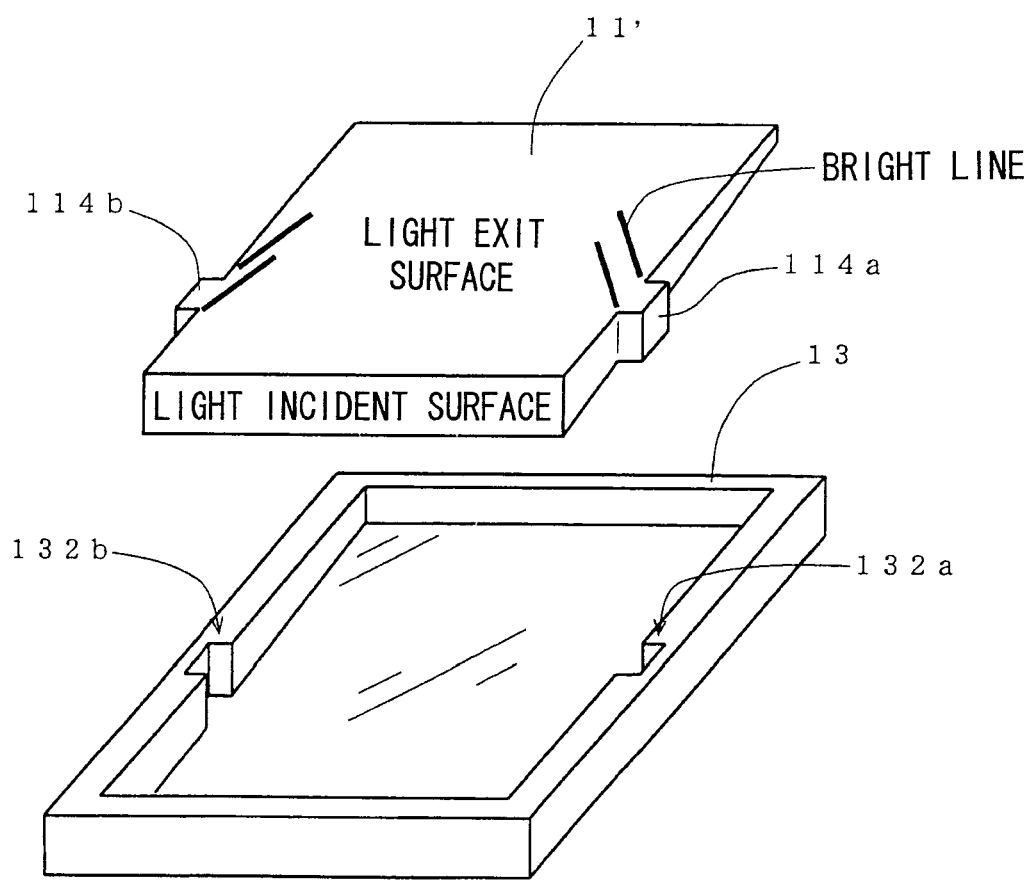
FIG. 8 is a perspective view showing a conventional backlight device.

FIGS. 6 and 7 show another preferred embodiment of the backlight device according to the present invention. This backlight device has a reflective case 14 whose both side ends are extended to sandwich a light guide plate 11 and a reflective sheet 15. Moreover, the reflective sheet 15 preferably has a rectangular or substantially rectangular shape whose portions corresponding to the portions of projections 111a and 111b are notched.

As a light source, other than a tubular light source such as a cold cathode tube, a point-like light source such as an LED (Light Emitting Diode) can be used. Moreover, as a light guide plate used in preferred embodiments of the present invention, other than the one of a wedge shape that is thick on the light incident surface side and thin on the surface side opposite to the light incident surface, any of conventional ones, such as those of a wedge shape that is thin on the light incident surface side and thick on the surface side opposite to the light incident surface and those of a planar shape, can be used.

With a backlight device and a liquid crystal device according to preferred embodiments of the present invention, displacement of a light guide plate caused by vibration, impact, and the like can be effectively prevented, and at the same time, occurrence of a bright line and a dark line is effectively prevented. This provides illumination light without brightness non-uniformity.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight device comprising:
   a case;
   a light guide plate fitted in the case; and
   a light source provided near at least one side surface of the light guide plate; wherein
   the light guide plate and the light source are housed completely inside the case;
   a projection is located on a back side of the light guide plate so that one surface of the projection is flush with a light incident surface;
   an area of a cross section of the projection that is substantially parallel with the light incident surface continuously decreases as the section is farther away from the light incident surface; and
   an engaging hole engaging with the projection is formed in the case.

2. The backlight device according to claim 1, wherein the projection comprises two projecting portions disposed one on each side portion of the back side of the light guide plate.

3. The backlight device according to claim 2, wherein boundaries between the light guide plate and the two projecting portions are chamfered or rounded.

4. A liquid crystal display device comprising:
   a liquid crystal panel; and
   a backlight device according to claim 1 arranged to irradiate the liquid crystal panel from behind.

5. A backlight device comprising:
   a case;
   a light guide plate including a light incident surface; and
   a light source provided near the light incident surface; wherein
   the light guide plate and the light source are housed completely inside the case;
   two projections are arranged on a back side of the light guide plate such that one surface of each of the two projections is flush with the light incident surface;
   the two projections are arranged one on each side portion of the back side of the light guide plate and such that a cross sectional area of the two projections continuously decreases away from the light incident surface;
   engagement holes arranged to engage with the two projections respectively are located in the case; and
   boundaries between the light guide plate and the two projections are chamfered or rounded.

6. The backlight device according to claim 5, wherein
   the case has a rectangular parallelepiped shape with an open top; and
   the light guide plate and the light source are housed inside the case such that the light guide plate and the light source are located inward from the open top of the case.

7. The backlight device according to claim 5, wherein
   a reflective sheet is fitted on the back side of the light guide plate; and
   the light guide plate is housed inside the case such that a back side of the light guide plate fits in the case with the reflective sheet interposed in between the light guide plate and the case.

8. A liquid crystal display device comprising:
   a backlight device according to claim 7; and
   a liquid crystal panel; wherein
   a light exit surface of the light guide plate is exposed at a top of the case; and
   light that has entered the light guide plate is deflected up toward the light exit surface by the reflective sheet so as to irradiate the liquid crystal panel from behind.

9. The liquid crystal display device according to claim 8, wherein
   the two projections are both arranged at positions outside of a display area of the liquid crystal display device.

* * * * *